(12) United States Patent
Grossinger et al.

(10) Patent No.: US 12,008,700 B1
(45) Date of Patent: *Jun. 11, 2024

(54) SPATIAL AUDIO AND AVATAR CONTROL AT HEADSET USING AUDIO SIGNALS

(71) Applicant: Meta Platforms Technologies, LLC, Menlo Park, CA (US)

(72) Inventors: Nadav Grossinger, Hillsborough, CA (US); Robert Hasbun, Placerville, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/120,808

(22) Filed: Mar. 13, 2023

Related U.S. Application Data

(63) Continuation of application No. 17/591,181, filed on Feb. 2, 2022, now Pat. No. 11,605,191, which is a
(Continued)

(51) Int. Cl.
*G06T 13/20* (2011.01)
*G02B 27/01* (2006.01)
(Continued)

(52) U.S. Cl.
CPC ........ *G06T 13/205* (2013.01); *G02B 27/0172* (2013.01); *G06N 20/00* (2019.01);
(Continued)

(58) Field of Classification Search
None
See application file for complete search history.

(56) References Cited

U.S. PATENT DOCUMENTS

| 9,942,687 | B1 | 4/2018 | Chemistruck et al. |
| 10,206,055 | B1 | 2/2019 | Mindlin et al. |

(Continued)

FOREIGN PATENT DOCUMENTS

| CN | 109416585 A | 3/2019 |
| EP | 3949447 A1 | 2/2022 |

(Continued)

OTHER PUBLICATIONS

Brandenburg K., et al., "Plausible Augmentation of Auditory Scenes Using Dynamic Binaural Synthesis for Personalized Auditory Realities," Audio Engineering Society, Conference Paper, Aug. 20-22, 2018, 10 pages.
(Continued)

*Primary Examiner* — Hilina K Demeter
(74) *Attorney, Agent, or Firm* — Potomac Law Group, PLLC; Dannon G. Allbee

(57) ABSTRACT

An audio system in a local area providing an audio signal to a headset of a remote user is presented herein. The audio system identifies sounds from a human sound source in the local area, based in part on sounds detected within the local area. The audio system generates an audio signal for presentation to a remote user within a virtual representation of the local area based in part on a location of the remote user within the virtual representation of the local area relative to a virtual representation of the human sound source within the virtual representation of the local area. The audio system provides the audio signal to a headset of the remote user, wherein the headset presents the audio signal as part of the virtual representation of the local area to the remote user.

20 Claims, 6 Drawing Sheets

Related U.S. Application Data continuation of application No. 16/869,925, filed on May 8, 2020, now Pat. No. 11,276,215.

(60) Provisional application No. 62/893,052, filed on Aug. 28, 2019.

(51) Int. Cl.
*G06N 20/00* (2019.01)
*G06T 13/40* (2011.01)
*G06T 19/00* (2011.01)
*G10L 21/10* (2013.01)
*H04R 5/033* (2006.01)

(52) U.S. Cl.
CPC ............ *G06T 13/40* (2013.01); *G06T 19/006* (2013.01); *G10L 21/10* (2013.01); *H04R 5/033* (2013.01); *G10L 2021/105* (2013.01)

(56) References Cited

U.S. PATENT DOCUMENTS

| | | | |
|---|---|---|---|
| 10,217,286 | B1 | 2/2019 | Angel et al. |
| 10,225,656 | B1 | 3/2019 | Kratz et al. |
| 10,602,298 | B2 | 3/2020 | Raghuvanshi et al. |
| 10,674,307 | B1 | 6/2020 | Robinson et al. |
| 10,755,463 | B1 | 8/2020 | Albuz et al. |
| 11,113,859 | B1* | 9/2021 | Xiao ................... G06T 15/005 |
| 2008/0243278 | A1 | 10/2008 | Dalton et al. |
| 2011/0069841 | A1 | 3/2011 | Angeloff et al. |
| 2012/0093320 | A1 | 4/2012 | Flaks et al. |
| 2012/0206452 | A1 | 8/2012 | Geisner et al. |
| 2013/0041648 | A1 | 2/2013 | Osman |
| 2013/0236040 | A1 | 9/2013 | Crawford et al. |
| 2015/0187112 | A1* | 7/2015 | Rozen ..................... G06T 13/40 345/473 |
| 2015/0373477 | A1 | 12/2015 | Norris et al. |
| 2016/0125876 | A1 | 5/2016 | Schroeter et al. |
| 2017/0039750 | A1 | 2/2017 | Tong et al. |
| 2017/0223478 | A1 | 8/2017 | Jot et al. |
| 2017/0280235 | A1* | 9/2017 | Varerkar ................ H04R 3/04 |
| 2017/0316115 | A1 | 11/2017 | Lewis et al. |
| 2017/0366896 | A1* | 12/2017 | Adsumilli .............. H04N 23/60 |
| 2018/0262849 | A1* | 9/2018 | Farmani ............... H04R 25/407 |
| 2018/0277133 | A1* | 9/2018 | Deetz ..................... G06F 3/162 |
| 2018/0302738 | A1* | 10/2018 | Di Censo ................ G06F 3/011 |
| 2019/0116448 | A1 | 4/2019 | Schmidt et al. |
| 2019/0130628 | A1* | 5/2019 | Cao ........................ G10L 21/10 |
| 2020/0037091 | A1 | 1/2020 | Jeon et al. |
| 2020/0174734 | A1 | 6/2020 | Gomes et al. |
| 2020/0265860 | A1 | 8/2020 | Mouncer et al. |
| 2020/0292817 | A1* | 9/2020 | Jones ................. G02B 27/0093 |
| 2020/0296521 | A1 | 9/2020 | Wexler et al. |
| 2020/0314583 | A1 | 10/2020 | Robinson et al. |
| 2021/0377690 | A1 | 12/2021 | Robinson et al. |

FOREIGN PATENT DOCUMENTS

| | | |
|---|---|---|
| WO | 2016014254 A1 | 1/2016 |
| WO | 2018182274 A1 | 10/2018 |
| WO | 2019079523 A1 | 4/2019 |
| WO | 2020079485 A2 | 4/2020 |
| WO | 2020197839 A1 | 10/2020 |

OTHER PUBLICATIONS

Final Office Action dated May 3, 2022 for U.S. Appl. No. 16/508,648, filed Jul. 11, 2019, 23 pages.
International Search Report and Written Opinion for International Application No. PCT/US2020/023071, dated Jul. 3, 2020, 13 Pages.
Non Final Office Action dated Feb. 15, 2022 for U.S. Appl. No. 16/508,648, filed Jul. 11, 2019, 27 pages.
Non-Final Office Action dated Jul. 18, 2022 for U.S. Appl. No. 17/402,012, filed Aug. 13, 2021, 10 pages.
Non-Final Office Action dated Jul. 2, 2021 for U.S. Appl. No. 16/508,648, filed Jul. 11, 2019, 27 pages.
Non-Final Office Action dated Jun. 23, 2020 for U.S. Appl. No. 16/259,990, filed Jan. 28, 2019, 27 pages.
Non-Final Office Action dated Aug. 25, 2022 for U.S. Appl. No. 16/508,648, filed Jul. 11, 2019, 23 pages.
Office Action dated Nov. 28, 2022 for Chinese Patent Application No. 202080022828.0, filed Sep. 18, 2021, 12 pages.
Plinge A., et al., "Six-Degrees-of-Freedom Binaural Audio Reproduction of First-Order Ambisonics with Distance Information," Audio Engineering Society, Conference Paper, Aug. 20-22, 2018, 10 pages.
Traer J., et al., "Statistics of Natural Reverberation Enable Perceptual Separation of Sound and Space," Proceedings of the National Academy of Sciences, Nov. 10, 2016, vol. 113 (48), pp. E7856-E7865.

* cited by examiner ated Aug. 28, 2019, which are hereby incorporated by reference
SPATIAL AUDIO AND AVATAR CONTROL AT HEADSET USING AUDIO SIGNALS

CROSS-REFERENCE TO RELATED APPLICATIONS

This application is a continuation of U.S. patent application Ser. No. 17/591,181, filed Feb. 2, 2022, and now U.S. Pat. No. 11,605,191, which is a continuation of U.S. patent application Ser. No. 16/869,925, filed May 8, 2020, and now U.S. Pat. No. 11,276,215, which claims benefit of U.S. Provisional Patent Application Ser. No. 62/893,052, filed Aug. 28, 2019, which are hereby incorporated by reference in its entirety.

BACKGROUND

The present disclosure relates generally to presentation of audio at a headset, and specifically relates to spatial audio and avatar control using captured audio signals.

A user wearing the headset can be teleported into a virtual representation of a local area (e.g., a conference room, a music hall, a stadium, etc.) that is remote to a physical location of the user. To convincingly experience an ambient in the virtual representation of the local area where the remote user has been teleported, sounds from the local area needs to be accurately presented to the remote user. For example, the remote user wearing the headset can experience movement through certain parts of the local area while being able to see at least a portion of the local area and hear at least portions of sounds originating in the local area. However, one problem in conventional systems is that the sound from the local area heard by the remote user wearing the headset is not adjusted properly when the remote user moves throughout the virtual representation of the local area and occupies different positions within the virtual representation of the local area relative to, e.g., a sound source in the local area. Another problem in the conventional systems is that, due to visual occlusions in the local area, certain portions of the local area cannot be imaged thus being effectively invisible to the remote user. This problem is especially severe when the occluded portions of the local area include a portion of a face of a person in the local area that is currently speaking. In this case, the remote user can hear that the person is speaking, but a face of a virtual representation of the person that is presented to the remote user is without any facial expressions (e.g., without any lips movement), which is highly undesirable from the point of view of the remote user.

SUMMARY

Embodiments of the present disclosure support an audio system, a method, and a computer readable medium for providing an audio signal to a headset of a remote user. The audio system includes at least one array of acoustic sensors configured to detect sounds within a local area. The audio system further includes at least one imaging device configured to image at least a portion of the local area. The audio system further includes a controller configured to identify sounds from a human sound source in the local area, based in part on the detected sounds. The controller further generates an audio signal for presentation to a remote user within a virtual representation of the local area based in part on a location of the remote user within the virtual representation of the local area relative to a virtual representation of the human sound source within the virtual representation of the local area. The controller then provides the audio signal to a headset of the remote user. The headset then presents the audio signal as part of the virtual representation of the local area to the remote user.

Figure 1:
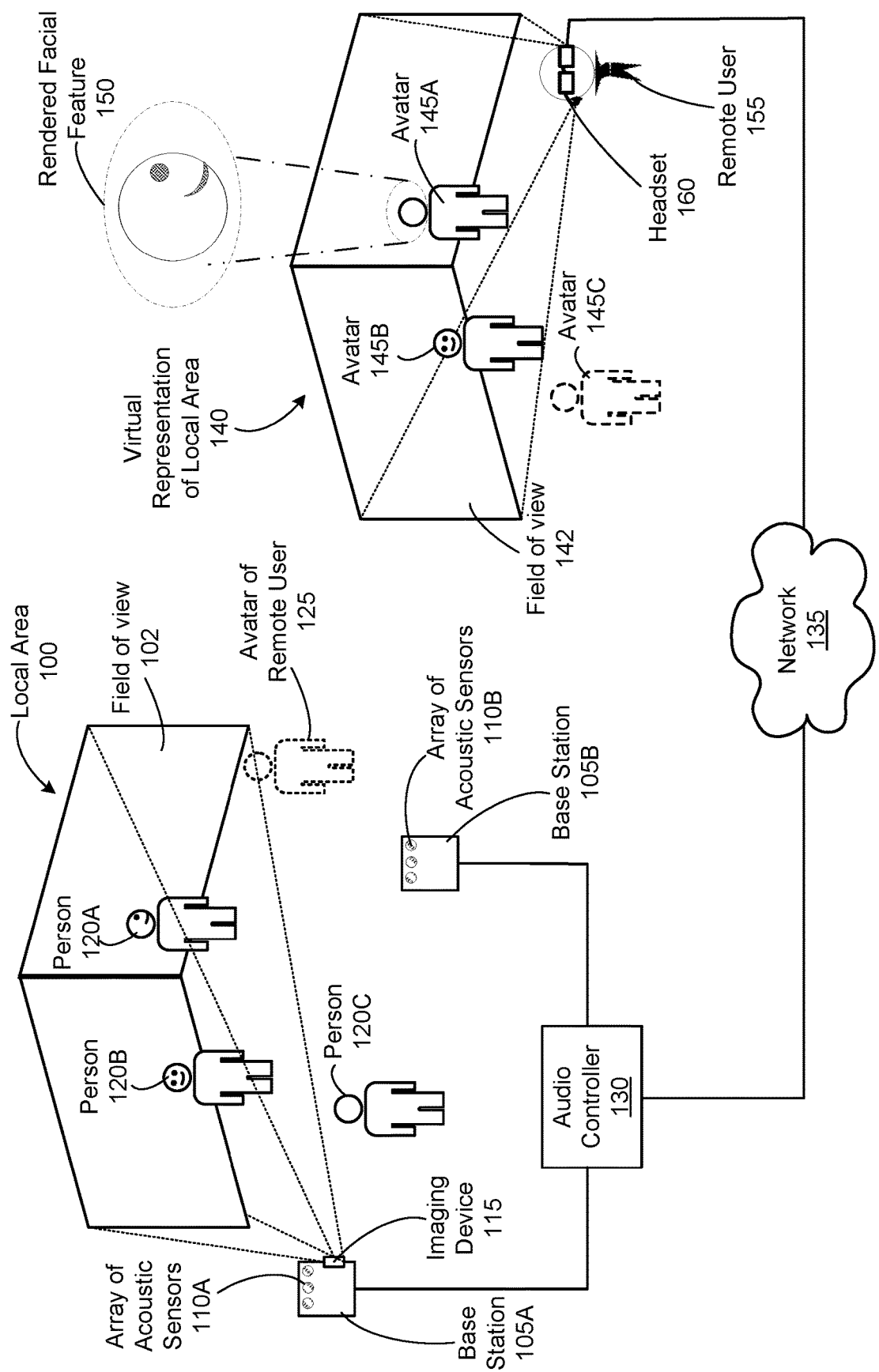
FIG. 1 illustrates an example audio system for use in a conferencing application, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset (head-mounted display or near-eye display), a head-mounted display (HMD) connected to a host computer system, a standalone HMD, a near-eye display (NED), a mobile device or computing system, or any other hardware platform capable of providing artificial reality content to one or more viewers.

An audio system presented herein is positioned within a local area occupied by one or more human sound sources and coupled (e.g., via a network) with at least one artificial reality headset worn by a user that is remote from the local area. The headset presents a virtual representation of the local area to the remote user. The audio system may include one or more base stations positioned within the local area. Each base station in the local area may include a microphone array, and at least one base station includes a camera (e.g., a depth camera). In some embodiments, the microphone array may be external to a base station. For example, the microphone array may include microphones on other devices (e.g., earbuds, headsets, etc.) within the local area.

A person/sound source in the local area may be facing away from the camera such that the person's face is occluded. The audio system uses the microphone array to determine that the person is a sound source. The audio system determines how sound emitted from the person/sound source should sound from the location of the remote user in the virtual representation of the local area. In some embodiments, a machine learning algorithm can be applied to the audio associated with the person/sound source to predict facial expressions (e.g., lips movement) of the person/sound source. The audio system may render (e.g., as part of an avatar) the predicted facial expressions of the person such that the predicted facial expressions are synched with a rendering of audio to the remote user for the location of the remote user in the virtual representation of the local area. In some embodiments, the prediction and rending of the facial expressions occurs only if the occluded area of the sound source falls within a defined threshold distance to a field of view of the headset. In some embodiments, the audio system (e.g., via an input from the remote user) may adjust audio signals from one or more of the people/sound sources associated with the virtual representation of the local area. For example, the user may provide an input (e.g., could be a gesture) that augments the audio signal associated with a first avatar (but would not affect other audio signals), and provide a second input that would attenuate the audio signal associated with a second avatar (but would not affect other audio signals). In another example, the input would filter a plurality of audio signals, e.g., cause an audio signal associated with a first avatar to be at a constant volume (or increase in volume) and other audio signals to attenuate, thereby emphasizing the audio signal associated with the first avatar.

The headset may be, e.g., a NED, HMD, or some other type of headset. The headset may be part of an artificial reality system. The headset further includes a display and an optical assembly. The display of the headset is configured to emit image light. The optical assembly of the headset is configured to direct the image light to an eye box of the headset corresponding to a location of a user's eye. In some embodiments, the image light may include depth information for a local area surrounding the headset.

FIG. 1 illustrates an example audio system for use in a conferencing application, in accordance with one or more embodiments. The conferencing application includes presentation of a local area 100 within a virtual representation 140 of the local area 100 to a remote user 155 wearing a headset 160, wherein the remote user 155 is remote from the local area 100. The local area 100 is occupied by one or more humans that can produce sounds, e.g., speech sounds. For example, as shown in FIG. 1, the local area 100 includes three different persons that each can produce sounds in the local area 100, e.g., a person 120A, a person 120B and a person 120C. In one embodiment, a single person in the local area 100 is speaking during a specific time period, e.g., the person 120A, the person 120B, or the person 120C speaks during the time period. Alternatively, multiple persons in the local area 100 may speak during a given time interval, e.g., two or more of the persons 120A, 120B, 120C speak during the time interval.

The local area 100 includes an audio system comprising multiple components that may be mounted on one or more base stations in the local area 100, e.g., base stations 105A, 105B. In some embodiments (not shown in FIG. 1), at least one of the components of the audio system is located in the local area 100 separate from the base stations 105A, 105B. In some of such cases, the local area 100 may not even include any base station. The audio system in the local area 100 may comprise at least one array of acoustic sensors (e.g., arrays of acoustic sensors 110A, 110B), one or more imaging devices (e.g., an imaging device 115), a transducer assembly (not shown in FIG. 1), an audio controller 130, one or more other components, or combination thereof.

Note in some embodiments, at least some of the array of acoustic sensors are external to a base station. For example, the array of acoustic sensors may be composed of microphones from earbuds and/or headsets that are within the local area. The audio system may track locations of each microphone in the microphone array. For example, for earbuds, the audio system may track audio sounds as a head/body (of a user wearing the earbuds) moves around the local area (potentially the devices could ultrasonically chirp to each other for continual calibration). In contrast, some devices (e.g., the headset) may have GPS and/or WiFi capability which the audio system may use for tracking (e.g., via triangulation).

The at least one array of acoustic sensors of the audio system in the local area 100 (e.g., the arrays of acoustic sensors 110A, 110B) is configured to detect sounds within the local area 100. In some embodiments, one array of acoustic sensors is mounted on each base station in the local area 100. For example, as shown in FIG. 1, the array of acoustic sensors 110A is mounted on the base station 105A, and the array of acoustic sensors 110B is mounted on the base station 105B. Each array of acoustic sensors 110A, 110B may be configured to detect sounds from a different portion of the local area 100. In some other embodiments (not shown in FIG. 1), the at least one of the arrays of acoustic sensors 110A, 110B is positioned in the local area 100 outside of the base stations 105A, 105B. An acoustic sensor may be a microphone, a vibration sensor, or some combination thereof. Additional details regarding a structure and operation of an array of acoustic sensors in the local area 100 are discussed below in connection with FIG. 2.

The imaging device 115 (camera) of the audio system in the local area 100 is configured to image at least a portion of the local area 100. In some embodiments, as shown in FIG. 1, the imaging device 115 is mounted on the base station 105A, and the other base station 105B does not include any imaging device. In some other embodiments (not shown in FIG. 1), each base station 105A, 105B includes at least one imaging device. In yet some other embodiments (not shown in FIG. 1), the imaging device 115 is positioned in the local area 100 separate of the base stations 105A, 105B. A field of view 102 of the imaging device 115 covers some or all of the local area 100. And people may move around within the local area 100 such that some or all of their faces are in the field of view 102 at different times. For example, in FIG. 1, a portion of a face of the person 120A is in the field of view 102, a portion of or none of a face of the person 120B (their back is to the imaging device 115) is in the field of view 102, and none of a face of the person 120C is in the field of view 102 (e.g., the person 120C is located outside of the field of view 102). In the illustrative embodiment of FIG. 1, some or all of the face of the person 120A is outside of the field of view 102 as the person 120A faces away from the imaging device 115.

On the other hand, the entire face of the person 120B is within the field of view 102. The person 120C is completely outside of the field of view 102 and may be outside of a field of view of any other imaging device in the local area 100. In some embodiments, the field of view 102 corresponds to a cumulative field of view of multiple imaging devices positioned in the local area 100 instead of the single imaging device 115. Additional details regarding a structure and operation of the imaging device 115 are discussed below in connection with FIG. 2.

In some embodiments, the audio system in the local area 100 includes a transducer assembly (not shown in FIG. 1) for producing sounds for persons 120A, 120B, 120C located in the local area 100. The transducer assembly may be coupled to the audio controller 130 for receiving audio instructions from the audio controller 130. The transducer assembly may produce sounds in the local area 100 based on the audio instructions from the audio controller 130 that are generated based on, e.g., an audio stream received from the headset 160 (e.g., via a network 135). The audio stream may be a sound signal (e.g., speech sound) originating from the remote user 155 and recorded within a physical location of the remote user 155. In one embodiment, the transducer assembly includes a plurality of transducers mounted on each base station 105A, 105B. In another embodiment, the transducer assembly is implemented as part of a display (i.e., television screen) in the local area 100 where e.g., at least a face of a virtual representation (avatar) 125 of the remote user 155 is presented. Additional details regarding a structure and operation of the transducer assembly are discussed below in connection with FIG. 2.

As shown in FIG. 1, the virtual representation 140 includes the remote user 155 and virtual representations of one or more persons (i.e., one or more human sound sources) from the local area 100, e.g., an avatar 145A, an avatar 145B and an avatar 145C being virtual representations of persons 120A, 120B and 120C, respectively. As further shown in FIG. 1, a virtual field of view 142 of the headset 160 that is presented to the remote user 155 includes the avatars 145A, 145B as the avatars 145A, 145B are virtual representations of persons 120A, 120B that are at least partially located within the field of view 102 in the local area 100. The virtual field of view 142 of the headset 160 may not include the avatar 145C as the person 120C is outside of the field of view 102 and any other field of view of any other imaging device in the local area 100.

The audio controller 130 of the audio system generates an audio signal for presentation to the remote user 155 wearing the headset 160 based on sounds detected within the local area 100. The audio controller 130 is coupled to other components of the audio system and to the headset 160. The audio controller 130 may communicate the generated audio signal to the headset 160, e.g., via the network 135. The audio controller 130 may be coupled to each array of acoustic sensors 110A, 110B and to the imaging device 115. And in some embodiments, the audio controller 130 may also be coupled to other devices within the local area that include microphones (e.g., earbuds and/or headsets). As shown in FIG. 1, the audio controller 130 is coupled to the components of the audio system via communication coupling (e.g., wired or wireless communication coupling) with each base station 105A, 105B in the local area 100. For embodiments when the local area 100 does not include any base station or the components of the audio system are not mounted on any base station, (1) the audio controller 130 is directly coupled to each array of acoustic sensors 110A, 110B and to the imaging device 115; (2) the audio controller 130 is coupled to devices (e.g., earbuds and/or headsets) within the local area 100; or some combination thereof. In some embodiments, the audio system in the local area 100 includes multiple controllers each coupled to one or more components of the audio system in the local area 100. The multiple controllers may perform initial processing of data obtained from each array of acoustic sensors 110A, 110B and/or the imaging device 115, and provide initially processed data to the audio controller 130 for further processing and communication to the headset 160 via the network 135.

To generate the audio signal for presentation to the remote user 155, the audio controller 130 identifies sounds from a human sound source in the local area 100 (e.g., the person 120A), based at least in part on the sounds from the local area 100 detected by the arrays of acoustic sensors 110A, 110B. To identify the sounds from each human sound source in the local area 100 (e.g., the person 120A), the audio controller 130 receives information about sounds from the entire local area 100 captured by e.g., the arrays of acoustic sensors 110A, 110B. The audio controller 130 then identifies one or more human sound sources (e.g., the persons 120A, 120B) in the local area 100 and audio streams from each human sound source in the local area 100.

In some embodiments, the audio controller 130 performs beam-steering type processing of the sounds captured by, e.g., the arrays of acoustic sensors 110A, 110B mounted on the base stations 105A, 105B to process portions of the sounds from different parts of the local area 100. By intersecting "beam-steering" vectors obtained for each portions of the sounds captured by a different array of acoustic sensors 110A, 110B, the audio controller 130 may determine one or more locations of one or more human sound sources in the local area 100. The audio controller 130 may then extrapolate audio as originating from the determined one or more location of the one or more human sound sources and spreading throughout the local area 100 to generate simulated sounds for a set of locations in the local area 100. The audio controller 130 may generate an audio signal for presentation to the remote user 155 wearing the headset 160 as part of the virtual representation 140 based on the simulated sounds for the set of locations in the local area 100. And in some embodiments, in addition to sounds from the human sound sources, the audio controller 130 may include within the audio signal other sounds from the room (e.g., ambient environment) that were captured by the arrays of acoustic sensors 110A, 110B.

In some other embodiments, to identify a human sound source in the local area 100, the audio controller 130 generates multiple versions of the detected sounds from the local area 100, e.g., by changing a defined set of acoustic parameters. Each version of the detected sounds may simulate sounds from a different human sound source in the local area 100 and/or from a different location of the human sound source in the local area 100. For example, the multiple versions of the detected sounds may represent simulated sounds originating from the persons 120A, 120B, or 120C and/or from different locations of the persons 120A, 120B, or 120C in the local area 100. By matching the versions of the detected sounds with the original detected sounds, the audio controller 130 then identifies the human sound source in the local area 100 and location information for the human sound source in the local area 100.

In some embodiments, the audio controller 130 identifies the sounds from a previously identified human sound sources in the local area 100 by performing beam-steering type processing of the detected sounds from the local area 100 using e.g., information about the identified location of the one or more human sound sources in the local area 100. For example, if the person 120A is identified as a human sound source in the local area 100, the audio controller 130 may perform beam-steering processing of sounds from the local area 100 detected by the arrays of acoustic sensors 110A, 110B by applying a defined set of beam-steering coefficients to the detected sounds for extracting sounds originating from a particular location of the person 120A. And in cases where the array of acoustic sensors includes microphones from other devices (e.g., earbuds and/or headsets) within the local area 100, the beam steering type processing may be based in part on location data (e.g., GPS data) for each of the microphones.

After identifying a human sound source in the local area 100 and the sounds from the human sound source, the audio controller 130 may extrapolate sounds originating from the human sound source throughout the local area 100 to generate simulated sounds for a set of locations in the local area 100. The audio controller 130 may use information about the simulated sounds for the set of locations in the local area 100 to generate an audio signal for presentation to the remote user 155 wearing the headset 160 as part of the virtual representation 140. The audio controller 130 thus generates the audio signal for presentation to the remote user 155, based in part on a location of the remote user 155 within the virtual representation 140 relative to a virtual representation of the human sound source within the virtual representation 140, e.g., relative to the avatar 145A if the person 120A is a human sound source in the local area 100. The audio controller 130 may utilize the previously extrapolated simulated sounds for the set of locations in the local area 100 to generate the audio signal for presentation to the remote user 155 by e.g., mapping location of the remote user 155 within the virtual representation 140 relative to the avatar 145A to a corresponding physical location in the local area 100 relative to the person 120A that is a current human sound source. The audio controller 130 provides the generated audio signal to the headset 160 of the remote user 155 for presenting the audio signal as part of the virtual representation 140 to the remote user 155. The audio controller 130 may communicate the generated audio signal to the headset 160 via the network 135.

For example, the person 120A is a human sound source in the local area 100 and the audio controller 130 generates the audio signal for presentation to the remote user 155 based on a location of the remote user 155 within the virtual representation 140 relative to the avatar 145A. When the remote user 155 is moving through the virtual representation 140 toward the avatar 145A, the audio controller 130 may generate the audio signal with e.g., gradually increasing amplitude thus providing the appropriate spatial awareness effect to the remote user 155. On the other hand, when the remote user 155 is moving through the virtual representation 140 away from the avatar 145A, the audio controller 130 may generate the audio signal with e.g., gradually decreasing amplitude. More generally, the audio signal generated by the audio controller 130 is based on a position of the remote user 155 in the virtual representation 140. For example, sound close to a virtual representation of a wall in the virtual representation 140 may sound differently than sound in a center of the virtual representation 140 due to sound propagation paths, e.g., due to geometry of the local area 100 represented by corresponding geometry of the virtual representation 140, materials the local area 100 represented by corresponding materials in the virtual representation 140, objects in the local area 100 represented by virtual objects in the virtual representation 140, etc.

In some embodiments, the remote user 155 is allowed to move within a portion of the virtual representation 140 that corresponds to a portion of the local area 100 covered by the imaging device 115 (i.e., the field of view 102) and any other imaging device in the local area 100, as the audio controller 130 provides visual information of only the portion of the local area 100 to the headset 160. Alternatively, the remote user 155 may be allowed to also move outside the portion of the virtual representation 140 that corresponds to the field of view 102 and any other field of view in the local area 100, as the audio controller 130 is configured to render additional visual information of the local area 100 that is outside the field of view 102 and any other field of view in the local area 100. In such case, the avatar 145C may be presented to the remote user 155 as the remote user 155 is freely moving through the virtual representation 140, although the person 120C associated with the avatar 145C is outside of the field of view 102 and any other field of view in the local area 100. Additionally, in some embodiments, audio signals associated with persons/sound sources not within the field of view 102 (e.g., person 120C) may still be presented to the remote user 155 (e.g., as part of the ambient sound).

In some embodiments, the audio controller 130 generates an avatar 125 of the remote user 155 for presentation to e.g., persons 120A, 120B, 120C in the local area 100. The avatar of remote user 125 may be provided on e.g., a display in the local area 100 and may include only a virtual representation of a face of the remote user 155 with or without any facial expressions. Alternatively, the avatar of remote user 125 may be a two-dimensional (2D) or a three-dimensional (3D) virtual representation (e.g., hologram) of the remote user 155 with or without any facial expressions. The audio controller 130 may be configured to receive any audio stream generated by the headset 160 based on sounds in a physical area surrounding the headset 160. In one or more embodiments, the audio stream generated by the headset 160 includes a voice signal of the remote user 155. The audio controller 130 may receive, via the network 135, the audio stream from the headset 160. The audio controller 130 may then present the audio stream to the local area 100 via the transducer assembly.

As discussed, the person 120A may be a human sound source in the local area 100. In the illustrative embodiment of FIG. 1, at least a portion of a face of the person 120A is not within the field of view 102 as the person 120A is facing away from the imaging device 115. Alternatively (not shown in FIG. 1), at least the portion of the face of the person 120A is not within the field of view 102 as a portion of a head of the person 120A is occluded from the point of view of the imaging device 115. While the portion of the face of the person 120A is not within the field of view 102, a virtual rendering of the portion of the face of the person 120A (e.g., a rendered facial feature 150 of the avatar 145A) can be within a threshold angle of the field of view 142 of the headset 160. In such case, the audio controller 130 may be configured to predict a facial expression (e.g., lips movement) for at least the portion of the face of the person 120A that is not within the field of view 102, based at least in part on the identified sounds from the person 120A. The audio controller 130 may perform, e.g., machine learning using the identified sounds from the person 120A to predict the facial expression for at least the portion of the face of the person 120A. Based on the predicted facial expression, the audio controller 130 may produce the rendered facial feature 150 of the avatar 145A for presentation to the remote user 155.

After predicting the facial expression for at least the portion of the face of the person 120A, the audio controller 130 may instruct the headset 160 (e.g., via the network 135) to present the rendered facial feature 150 of the avatar 145A to the remote user 155. The audio controller 130 may instruct the headset 160 (e.g., via the network 135) to present the rendered facial feature 150 synchronized with the generated audio signal that corresponds to the sounds (e.g., speech sounds) from the person 120A representing a human sound source in the local area 100. In some embodiments, the audio controller 130 communicates, via the network 135, information about the predicted facial expression for the portion of the face of the person 120A and information about the generated audio signal to the headset 160. The headset 160 may then generate, based on the received information, the rendered facial feature 150. The headset 160 then presents the rendered facial feature 150 in sync with the generated audio signal to the remote user 155. If no other person besides the person 120A is currently speaking in the local area 100, no facial features are rendered for any other avatar in the virtual representation 140, i.e., faces of other avatars presented to the remote user 155 in the virtual representation 140 are without any facial expressions. Alternatively, as the entire face of the person 120B is within the field of view 102, facial features of the avatar 145B (e.g., eyes, nose, mouth, etc.) is presented to the remote user 155 as part of the virtual representation 140.

In some embodiments, the person 120B is a human sound source in the local area 100. The person 120B may be the only human sound source in the local area 100. Alternatively, there are one or more other human sound sources in the local area 100 besides the person 120B, e.g., the person 120A can speak in the same time as the person 120B. As discussed, the audio controller 130 identifies sounds from the person 120B and/or sounds from the person 120B, based in part on the sounds within the local area 100 detected by the array of acoustic sensors 110A and/or the array of acoustic sensors 110B. The audio controller 130 generates an audio signal for presentation to the remote user 155 within the virtual representation 140 based in part on a location of the remote user 155 within the virtual representation 140 relative to the avatar 145B and/or the avatar 145A. The audio controller 130 provides, via the network 135, the audio signal to the headset 160 for presentation as part of the virtual representation 140 to the remote user 155.

In the illustrative embodiment of FIG. 1, an entire face of the person 120B is within the field of view 102. In such case, visual information about facial expressions for the face of the person 120B can be captured by the imaging device 115. The audio controller 130 may then communicate, via the network 135, the visual information captured by the imaging device 115 to the headset 160 for presentation to the remote user 155 as rendered facial features of the corresponding avatar 145B. The audio controller 130 may instruct the headset 160 to present the rendered facial features of the corresponding avatar 145B in sync with the generated audio signal. If no other person besides the person 120B is speaking in the local area 100, the audio controller 130 may not render any facial features for any other avatar, i.e., faces of other avatars presented to the remote user 155 as part of the virtual representation 140 are without any facial expressions.

In some embodiments, audio signals provided via the headset 160 (and/or some speaker(s)) to the remote user 155 for one or more of the people/sound sources within the virtual representation of the local area 140 may be selectively adjusted. In some embodiments, the remote user 155 provides one or more inputs to the audio system (e.g., via the headset 150 and/or some peripheral device) that selectively adjusts audio signals associated with one or more sound sources/persons. The inputs may be, e.g., gesture based, via a graphical user interface, via mechanical means (e.g., buttons, dials, etc. on the headset 160 and/or some peripheral device), or some combination thereof. The selective adjustment of an audio signal filters the one or more audio signals associated with the input. Selective adjustment may include, e.g., adjustment in volume (e.g., attenuation or amplification), adjustment in frequency, masking (e.g., scrambling voice), some other filter applied to the audio signal, or some combination thereof. The headset 160 receives the one or more inputs (e.g., captures images of a gesture). In some embodiments, the headset 160 may directly adjust the audio signal in accordance with the input. In other embodiments, the headset 160 provides the one or more inputs (e.g., captured images) to the audio controller 130 (e.g., via the network 135), and the audio controller 130 adjusts the audio signals accordingly. In this manner, the remote user can selectively adjust the audio signals of one or more of the sound sources (e.g., avatars, fans, TVs, etc.) within the virtual representation of the local area.

In some embodiments, this adjustment may be specific to a single audio signal while not affecting other audio signals. For example, a gesture to control volume may be to point the index finger at an avatar with the thumb up, and a rotation of the thumb to the right may cause an increase in volume for the audio signal associated with the avatar and a rotation to the thumb to the left may cause a decrease in volume of the audio signal associated with the avatar—and both actions would not adjust other audio signals being presented. In contrast, in other embodiments, the adjustment affects a plurality of audio sources. For example, the input associated with a first avatar and corresponding audio signal could cause emphasize the audio signal relative to other audio signals being presented. For example, the input may cause the audio signal associated with the first avatar to be at a constant volume (or increase in volume) and other audio signals associated with other audio signals to attenuate, thereby emphasizing the audio signal associated with the first avatar.

The headset 160 captures images of the gesture. In some embodiments, the headset 160 may identify the gesture as an input, and adjust the audio signal associated with the avatar accordingly while not adjusting other audio signals (e.g., for other avatars) being presented to the user. In other embodiments, the headset 160 provides the captured images to the audio controller 130 (e.g., via the network 135), and the audio controller 130 adjusts the audio signal accordingly.

The network 135 connects the headset 160 to the audio controller 130. The network 135 may include any combination of local area and/or wide area networks using both wireless and/or wired communication systems. For example, the network 135 may include the Internet, as well as mobile telephone networks. In one embodiment, the network 135 uses standard communications technologies and/or protocols. Hence, the network 135 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 135 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 135 may also connect multiple headsets located in the same or different physical locations to the audio controller 130.

The headset 160 presents media to a user. In one embodiment, the headset 160 may be a NED. In another embodiment, the headset 160 may be a HMD. In general, the headset 160 may be worn on the face of a user such that content (e.g., media content) is presented using one or both lens of the headset. However, the headset 160 may also be used such that media content is presented to a user in a different manner. Examples of media content presented by the headset 160 include one or more images, video, audio, or some combination thereof. Additional details regarding operations and components of the headset 160 are discussed below in connection with FIG. 2, FIGS. 4A-4B and FIG. 5.

Figure 2:
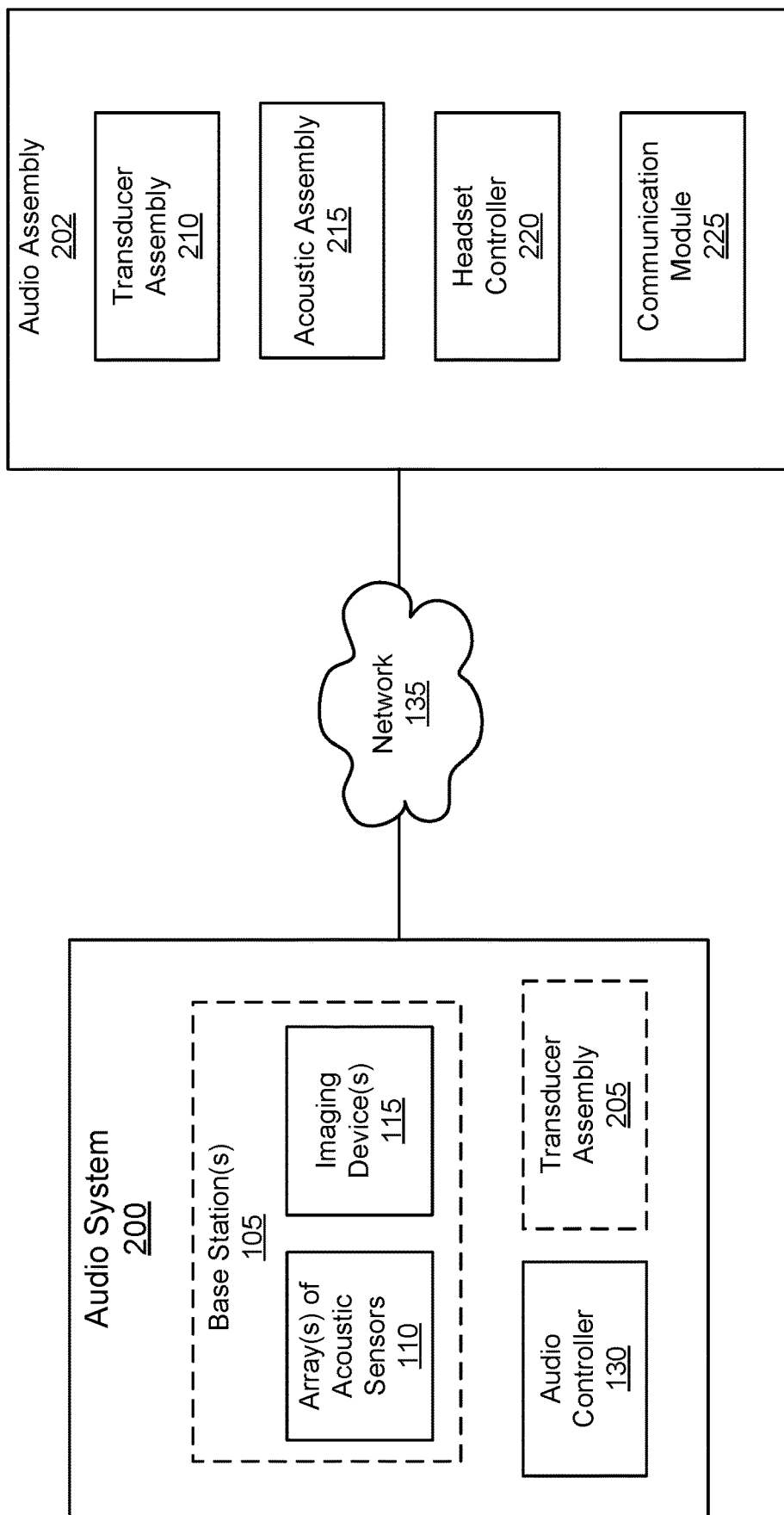
FIG. 2 is a block diagram of an audio system connected to an audio assembly of a headset via a network, in accordance with one or more embodiments.

FIG. 2 is a block diagram of an audio system 200 connected to an audio assembly 202 of the headset 160 via the network 135, in accordance with one or more embodiments. The audio system 200 may be located in the local area 100 that is remote from the headset 160. The audio system 200 includes one or more arrays of acoustic sensors 110, one or more imaging devices 115, and the audio controller 130 coupled to the one or more arrays of acoustic sensors 110 and the one or more imaging devices 115. The audio system 200 may further include a transducer assembly 205 for presenting audio to the local area 100. In some embodiments, the one or more arrays of acoustic sensors 110 and the one or more imaging devices 115 are mounted on the one or more base stations 105 positioned in various locations of the local area 100. Alternatively, the one or more arrays of acoustic sensors 110 and the one or more imaging devices 115 are positioned in the local area 100 separate from any base stations. And in some embodiments, some or all of the array of acoustic sensors 110 are coupled to external devices (e.g., earbuds and/or headsets) within the local area 100.

The one or more arrays of acoustic sensors 110 detect sounds within the local area 100. Each array of acoustic sensors 110 that may be mounted on a different base station 105 detects portions of the sounds within a specific part of the local area 100, e.g., within a defined vicinity from the base station 105 where the array of acoustic sensors 110 is mounted. In some embodiments, the array of acoustic sensors 110 is located outside of the base station 105, e.g., the array of acoustic sensors 110 may be mounted on one or more walls of the local area 100 or positioned at some other locations in the local area 100, may be part of one or more earbuds (with microphones) within the local area 100, may be part of one or more headsets (with microphones) within the local area, or some combination thereof. In embodiments where one or more earbuds, these devices may or may not have GPS for tracking (discussed above). Also, in some cases, the earbuds may have pass through of sound in the room so that the people in the room are able to interact with each other and the room in real-time/have a normal experience. And in some embodiments, the earbuds could be bone conduction audio, air conduction (e.g., open air head mounted audio), or some combination thereof.

Each array of acoustic sensors 110 may be coupled to the audio controller 130 for providing the detected sounds within the local area 100 to the audio controller 130 for further processing.

In some embodiments, the array of acoustic sensors 110 is implemented as an array of microphones, e.g., mounted on the base station 105 or positioned at some other location in the local area 100. Each microphone in the array acoustic sensors 110 is a transducer that converts a pressure from a sound wave into an electrical signal. The frequency response of the microphone may be relatively flat in some portions of a frequency range and may be linear in other portions of a frequency range.

The one or more imaging devices 115 (e.g., cameras) image at least a portion of the local area 100. In one embodiment, the audio system 200 includes one imaging device 115 mounted on the base station 105. In another embodiment, the audio system 200 includes two or more imaging devices 115 mounted on the one or more base stations 105. The at least one imaging device 115 is configured to image a specific portion of the local area 100 within a field of view of the least one imaging device 115. The imaging device 115 may be part of a depth camera assembly (DCA) that captures depth image data describing depth information for a portion of the local area 100 within a field of view of the DCA. The image data captured by the imaging device 115 may be images of light projected onto the portion of the local area 100 (e.g., by a light projector of the DCA) and reflected from the portion of the local area 100. The DCA with the imaging device 115 may determine depth information for the portion of the local area 100 based on features of reflected structured light, time-of-flight information, some other depth sensing technique, or combination thereof. The imaging device 115 may provide the depth information for the portion of the local area 100 to the audio controller 130 for further processing. The DCA with the imaging device 115 may be part of simultaneous localization and mapping (SLAM) sensors mounted on the base stations 105 (or outside the base stations 105) for capturing visual information of at least a portion of the local area 100.

The audio controller 130 identifies sounds from a human sound source in the local area 100, based in part on the sounds detected by the one or more arrays of acoustic sensors 110. The audio controller 130 generates an audio signal for presentation to a user of the headset 160 within a virtual representation of the local area 100 based in part on a location of the user within the virtual representation of the local area relative to a virtual representation of the human sound source within the virtual representation of the local area 100. In some embodiments, the audio controller 130 may include within the audio signal (or as a separate audio signal that) other sounds from the room (e.g., ambient environment) that were captured by the one or more arrays of acoustic sensors 110. The audio controller 130 provides the audio signal to the headset 160 for presentation to the user.

In some embodiments, the audio controller 130 may selectively adjust one or more audio signals in accordance with inputs from a remote user. The inputs may be, e.g., gesture based, via a graphical user interface, via mechanical means (e.g., buttons, dials, etc. on the headset 160 and/or some peripheral device), or some combination thereof. Each input is associated with one or more specific sound sources (e.g., human sound sources). The selective adjustment of an audio signal filters the audio signal associated with one or more specific sound sources (e.g., human sound sources). Selective adjustment may include, e.g., adjustment in volume, adjustment in frequency, masking (e.g., scrambling voice), some other filter applied to the audio signal, or some combination thereof. In some embodiments, responsive to receiving an input, the audio controller 130 determines audio signals that are respectively associated with the one or more sound sources, and selectively adjusts the respective audio signals in accordance with the one or more inputs. The audio controller 130 provides the one or more adjusted audio signals to the headset 160 for presentation to the user.

In some embodiments, responsive to a portion of a face of the human sound source not being within a field of view of the at least one imaging device 115 and a virtual rendering of the portion of the face being within a threshold angle of a field of view of the user, the audio controller 130 predicts a facial expression for the portion of the face, based at least in part on the identified sounds from the human sound source. The audio controller 130 further instructs the headset 160 to present the facial expression such that the presented facial expression is in sync with the presented audio signal. The audio controller 130 may communicate, via the network 135, information about the predicted facial expression being in sync with the audio signal to the user of the headset 160, e.g., to the headset controller 220. In one or more embodiments, the audio controller 130 may apply e.g., a machine learning algorithm to the identified sounds from the human sound source to predict the facial expression for the portion of the face of the human sound source.

In some embodiments, the audio system 200 includes a transducer assembly 205 that produces sounds for persons located in the local area 100. The transducer assembly 205 may be coupled to the audio controller 130. The transducer assembly 205 may produce sounds in the local area 100 based on instructions from the audio controller 130 that are generated based on an audio stream received from the headset 160 (e.g., via the network 135) with information about a speech signal from the user of the headset 160. The transducer assembly 205 may be implemented as an array of speakers that produce sound by generating acoustic pressure waves, e.g., in accordance with the audio instructions from the audio controller 130. Each speaker of the transducer assembly 205 may cover different parts of a frequency range, and may be implemented as a piezoelectric transducer, a moving coil transducer, some other transducer, or combination thereof.

In one embodiment, the audio system 200 further comprises an input interface (not shown in FIG. 2) for, e.g., controlling operations of different components of the audio system 200. In other embodiments, the audio system 200 can have any combination of the components listed with any additional components.

The audio assembly 202 includes a transducer assembly 210, an acoustic assembly 215, a headset controller 220, and a communication module 225, one or more other components, or combination thereof. The audio assembly 202 is part of the headset 160 and is coupled to the audio system 200 (e.g., to the audio controller 130) via the network 135.

The transducer assembly 210 produces sound for user's ears, e.g., based on audio instructions from the headset controller 220. In some embodiments, the transducer assembly 210 is implemented as pair of air conduction transducers (e.g., one for each ear) that produce sound by generating an airborne acoustic pressure wave in the user's ears, e.g., in accordance with the audio instructions from the headset controller 220. Each air conduction transducer of the transducer assembly 210 may include one or more transducers to cover different parts of a frequency range. For example, a piezoelectric transducer may be used to cover a first part of a frequency range and a moving coil transducer may be used to cover a second part of a frequency range. In some other embodiments, each transducer of the transducer assembly 210 is implemented as a bone conduction transducer that produces sound by vibrating a corresponding bone in the user's head. Each transducer implemented as a bone conduction transducer may be placed behind an auricle coupled to a portion of the user's bone to vibrate the portion of the user's bone that generates a tissue-borne acoustic pressure wave propagating toward the user's cochlea, thereby bypassing the eardrum.

The acoustic assembly 215 monitors and records sounds in a physical area surrounding some or all of the headset 160. The acoustic assembly 215 may include a plurality of acoustic sensors, e.g., one acoustic sensor for each ear. Alternatively, the acoustic assembly 215 includes an array of acoustic sensors (e.g., microphones) mounted on various locations of the headset 160. An acoustic sensor of the acoustic assembly 215 detects acoustic pressure waves at the entrance of the ear. One or more acoustic sensors of the acoustic assembly 215 may be positioned at an entrance of each ear. The one or more acoustic sensors are configured to detect the airborne acoustic pressure waves formed at an entrance of the ear. In one embodiment, the acoustic assembly 215 provides information regarding the produced sound to the headset controller 220. In another embodiment, the acoustic assembly 215 transmits feedback information of the detected acoustic pressure waves to the headset controller 220, and the feedback information may be used by the headset controller 220 for calibration of the transducer assembly 210.

In some embodiments, the acoustic assembly 215 includes a microphone. A microphone is a transducer that converts pressure into an electrical signal. The frequency response of the microphone may be relatively flat in some portions of a frequency range and may be linear in other portions of a frequency range. The microphone may be configured to receive a signal from the headset controller 220 to scale a detected signal from the microphone based on the audio instructions provided to the transducer assembly 210. For example, the signal may be adjusted based on the audio instructions to avoid clipping of the detected signal or for improving a signal to noise ratio in the detected signal.

The headset controller 220 provides audio instructions to the transducer assembly 210 for generating sound, e.g., based on the audio signal generated by the audio system 200. The headset controller 220 may further present video content, e.g., on a display of the headset 160. The headset controller 220 may receive, from the audio system 200 via the network 135, information about the predicted facial expression of the human sound source in the local area 100 and information about the audio signal from the local area 100 for presentation to the user of the headset 160. The headset controller 220 may present the rendered predicted facial expression on the display of the headset 160 in sync with the rendered audio signal presented via the transducer assembly 210 to the user of the headset 160, wherein the facial expression and the audio signal may be rendered by the audio controller 130. Alternatively, the headset controller 220 may render the predicted facial expression and the audio signal such that the predicted facial expression is presented on the display of the headset 160 in sync with the rendered audio signal provided to the user of the headset 160 via the transducer assembly 210. The headset controller 220 may further generate an audio stream based on sound in a physical area surrounding the headset 160 monitored by the acoustic assembly 215. In some embodiments, the audio stream generated by the headset controller 220 includes a voice signal of the user of the headset 160. The headset controller 220 may provide the audio stream to the communication module 225 for communicating to the audio system 200 via the network 135 for presentation in the local area.

In some embodiments, the headset controller 220 may selectively adjust one or more audio signals in accordance with inputs from a remote user. The inputs may be, e.g., gesture based, via a graphical user interface, via mechanical means (e.g., buttons, dials, etc. on the headset and/or some peripheral device), or some combination thereof. In some embodiments, responsive to receiving an input, the headset controller 220 determines audio signals that are respectively associated with the one or more sound sources, and selectively adjusts the respective audio signals in accordance with the one or more inputs. Note that in some embodiments, the headset controller 220 may provide the received inputs to the audio controller 130 via the network 135, and the audio controller 130 would adjust audio signals associated with the input accordingly.

The communication module 225 (e.g., a transceiver) is coupled to the headset controller 220 and may be integrated as a part of the headset controller 220. The communication module 225 may communicate with the audio controller 130 of the audio system 200, e.g., via the network 135. The communication module 225 may receive, from the audio system 200 via the network 135, information about the predicted facial expression of the human sound source and information about the audio signal for presentation to the user of the headset 160. The communication module 225 may provide the received information about the predicted facial expression of the human sound source and the received information about the audio signal to the headset controller 220 for appropriate rendering for in-sync presentation to the user of the headset 160. The communication module 225 may obtain the audio stream with the voice signal of the user of the headset 160, e.g., from the headset controller 220 or directly from the acoustic assembly 215. The communication module 225 may communicate, via the network 135, the voice signal of the user of the headset 160 to the audio controller 130 of the audio system 200 for presentation in the local area 100.

Figure 3:
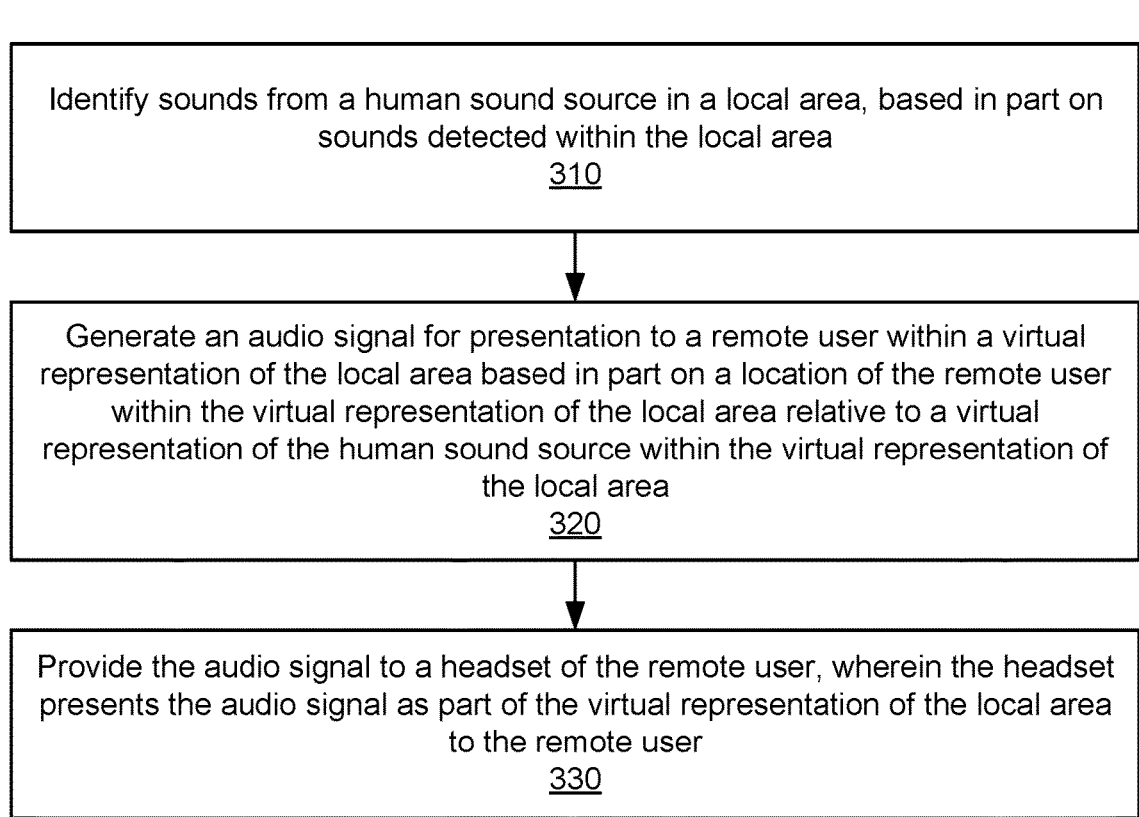
FIG. 3 is a flowchart illustrating a process for providing an audio signal from a local area to a headset of a remote user, in accordance with one or more embodiments.

FIG. 3 is a flowchart illustrating a process 300 for providing an audio signal from a local area to a headset of a remote user, in accordance with one or more embodiments. The process 300 of FIG. 3 may be performed by the components of an audio system, e.g., the audio system 200 of FIG. 2 having components shown in FIGS. 1-2. Other entities (e.g., components of the headset 160 of FIGS. 4A-4B and/or components shown in FIG. 5) may perform some or all of the steps of the process in other embodiments. Likewise, embodiments may include different and/or additional steps, or perform the steps in different orders.

The audio system identifies 310 (e.g., via a controller) sounds from a human sound source in a local area, based in part on sounds detected within the local area. In some embodiments, the audio system captures sounds from the entire local area. The audio system identifies one or more sound sources within the local area and identifies audio streams from each sound source. In some embodiments, the audio system generates multiple versions of the detected sounds from the local area, each version of the detected sounds simulating at least one of sounds from a different human sound source in the local area and sounds from a different location of that human sound source in the local area. The audio system identifies the human sound source in the local area by matching the versions of the detected sounds with the detected sounds. The audio system may determine the sounds from the human sound source by performing beam-steering type processing of the detected sounds from the local area using location information of the human sound source.

The audio system generates 320 an audio signal (e.g., via the controller) for presentation to a remote user within a virtual representation of the local area based in part on a location of the remote user within the virtual representation of the local area relative to a virtual representation of the human sound source within the virtual representation of the local area. In some embodiments, responsive to a portion of a face of the human sound source not being within a field of view of at least one imaging device in the local area and a virtual rendering of the portion of the face being within a threshold angle of a field of view of the remote user, the audio system predicts (e.g., via the controller) a facial expression for the portion of the face, based at least in part on the identified sounds from the human sound source. In one or more embodiments, the audio system predicts (e.g., via the controller) the facial expression for the portion of the face based on machine learning using the identified sounds from the human sound source.

The audio system provides 330 (e.g., via the controller) the audio signal to a headset of the remote user. The headset presents the audio signal as part of the virtual representation of the local area to the remote user. In some embodiments, the audio system instructs (e.g., via the controller) the headset to present the predicted facial expression for the portion of the face of the human sound source such that the presented facial expression is in sync with the presented audio signal. In one or more embodiments, the audio system communicates (e.g., via a network) information about the predicted facial expression being in sync with the audio signal to the remote user.

Figure 4A:
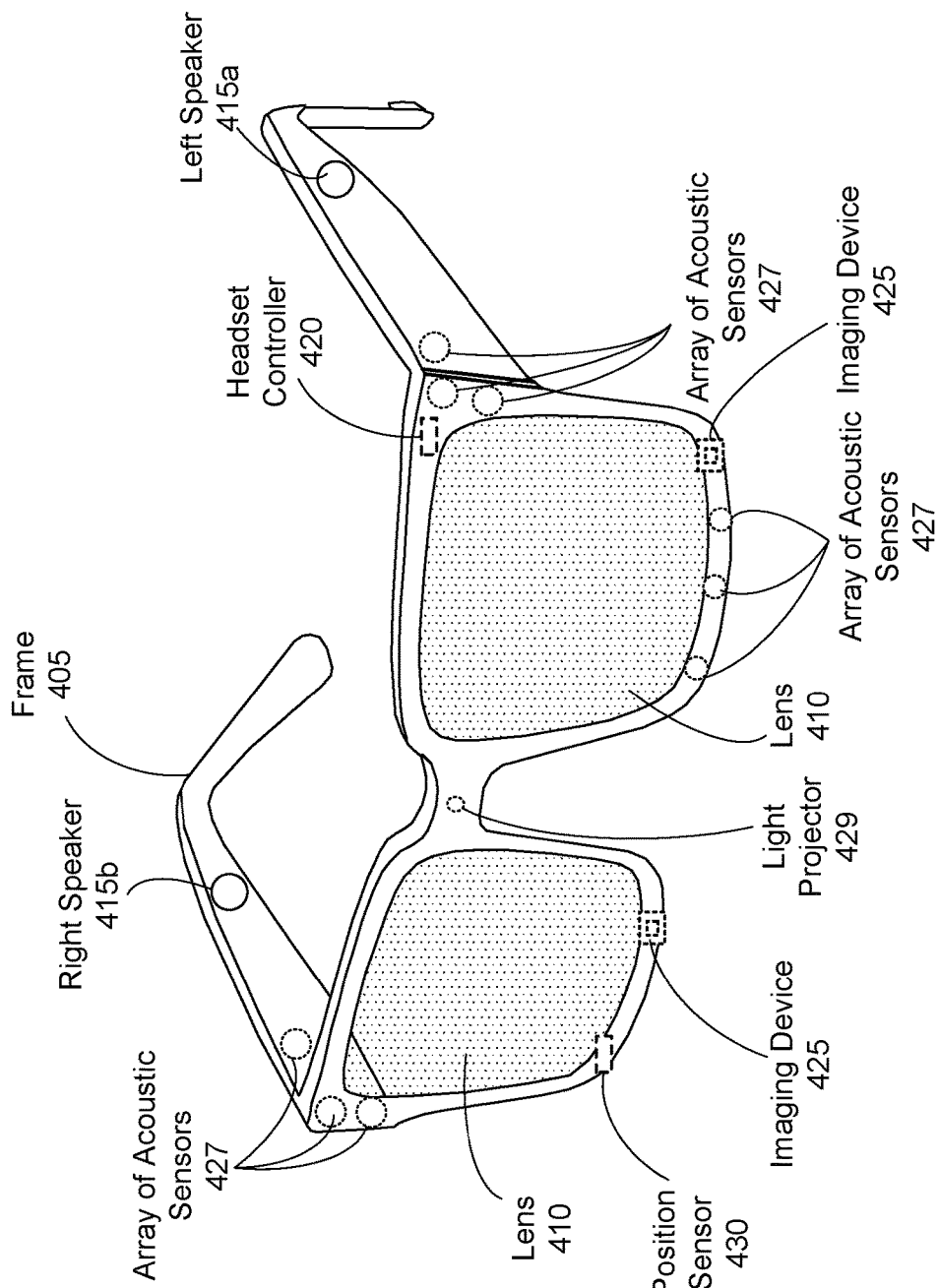
FIG. 4A is a perspective view of a headset implemented as a near-eye display, in accordance with one or more embodiments.

FIG. 4A is a perspective view of the headset 160 implemented as a NED, in accordance with one or more embodiments. In general, the headset 160 may be worn on the face of a user such that content (e.g., media content) is presented using one or both lenses 410 of the headset 160. However, the headset 160 may also be used such that media content is presented to a user in a different manner. Examples of media content presented by the headset 160 include one or more images, video, audio, or some combination thereof. The headset 160 may include, among other components, a frame 405, a lens 410, one or more optional imaging devices 425, an optional light projector 429, a position sensor 430, and an audio assembly. The audio assembly of the headset 160 includes, e.g., a left speaker 415a, a right speaker 415b, a headset controller 420, an array of acoustic sensors 427, one or more other components, or combination thereof. The audio assembly of the headset 160 is an embodiment of the audio assembly 202 of FIG. 2. While FIG. 4A illustrates the components of the headset 160 in example locations on the headset 160, the components may be located elsewhere on the headset 160, on a peripheral device paired with the headset 160, or some combination thereof.

The headset 160 may correct or enhance the vision of a user, protect the eye of a user, or provide images to a user. The headset 160 may be eyeglasses which correct for defects in a user's eyesight. The headset 160 may be sunglasses which protect a user's eye from the sun. The headset 160 may be safety glasses which protect a user's eye from impact. The headset 160 may be a night vision device or infrared goggles to enhance a user's vision at night. The headset 160 may be a near-eye display that produces artificial reality content for the user. Alternatively, the headset 160 may not include a lens 410 and may be a frame 405 with an audio assembly that provides audio content (e.g., music, radio, podcasts) to a user.

The frame 405 holds the other components of the headset 160. The frame 405 includes a front part that holds the lens 410 and end pieces to attach to a head of the user. The front part of the frame 405 bridges the top of a nose of the user. The end pieces (e.g., temples) are portions of the frame 405 to which the temples of a user are attached. The length of the end piece may be adjustable (e.g., adjustable temple length) to fit different users. The end piece may also include a portion that curls behind the ear of the user (e.g., temple tip, ear piece).

The lens 410 provides or transmits light to a user wearing the headset 160. The lens 410 may be prescription lens (e.g., single vision, bifocal and trifocal, or progressive) to help correct for defects in a user's eyesight. The prescription lens transmits ambient light to the user wearing the headset 160. The transmitted ambient light may be altered by the prescription lens to correct for defects in the user's eyesight. The lens 410 may be a polarized lens or a tinted lens to protect the user's eyes from the sun. The lens 410 may be one or more waveguides as part of a waveguide display in which image light is coupled through an end or edge of the waveguide to the eye of the user. The lens 410 may include an electronic display for providing image light and may also include an optics block for magnifying image light from the electronic display.

The speakers 415a and 415b produce sound for user's ears. The speakers 415a, 415b are embodiments of transducers of the transducer assembly 210 in FIG. 2. The speakers 415a and 415b receive audio instructions from the headset controller 420 to generate sounds. The left speaker 415a obtains a left audio channel from the headset controller 420, and the right speaker 415b obtains a right audio channel from the headset controller 420. As illustrated in FIG. 4, each speaker 415a, 415b is coupled to an end piece of the frame 405 and is placed in front of an entrance to the corresponding ear of the user. Although the speakers 415a and 415b are shown exterior to the frame 405, the speakers 415a and 415b may be enclosed in the frame 405. In some embodiments, instead of individual speakers 415a and 415b for each ear, the headset 160 includes a speaker array (not shown in FIG. 4) integrated into, e.g., end pieces of the frame 405 to improve directionality of presented audio content.

In some embodiments, the headset 160 includes a DCA comprising the one or more imaging devices 425, the light projector 429 and a DCA controller (not shown in FIG. 4A). The one or more imaging devices 425 capture depth image data describing depth information for a local area surrounding the headset 160. The captured data may be images captured by the one or more imaging devices 425 of light projected onto the local area by the light projector 429. The light projector 429 may emit e.g., structured light and/or flash illumination for time-of-flight. The imaging device 425 is an embodiment of the imaging device 115 of FIGS. 1-2.

The DCA controller may compute the depth information of the local area using the captured data by applying a depth determination technique. In one embodiment, the depth determination technique is direct/indirect time-of-flight depth sensing. In another embodiment, the depth determination technique is structured light depth sensing. In yet another embodiment, the depth determination technique is stereo depth sensing. In such case, the imaging devices 425 are oriented to capture portions of the local area in stereo. The captured data may be images of the local area captured by multiple cameras of the imaging devices 425 in stereo. In yet another embodiment, the depth determination technique is active stereo depth sensing. In such case, the light projector 429 projects structured light adding texture (features) that facilitate stereo sensing.

Based on the determined depth information, the DCA controller may determine absolute positional information of the headset 160 within the local area. The DCA controller may also generate a model of the local area. The one or more imaging devices 425 may be integrated within the headset 160 or may be positioned within the local area external to the headset 160. In some embodiments, the DCA controller may provide the depth image data to the headset controller 420, e.g., for further processing and communication to the audio controller 130 of the audio system 200. The one or more imaging devices 425 may be part of SLAM sensors mounted the headset 160 for capturing visual information of a local area surrounding some or all of the headset 160.

The array of acoustic sensors 427 monitors and records sound in a local area surrounding some or all of the headset 160, including sound (e.g., speech) generated by the user of the headset 160. The array of acoustic sensors 427 is an embodiment of the acoustic assembly 215 of FIG. 2. As illustrated in FIG. 4A, the array of acoustic sensors 427 include multiple acoustic sensors with multiple acoustic detection locations that are positioned on the headset 160. In some embodiments, the array of acoustic sensors 427 are located on the frame 405 as close as possible to a user's mouth to accurately capture the speech sound generated by the user. The array of acoustic sensors 427 may provide the recorded sound as an audio stream to the headset controller 420, e.g., for processing and communicating to the audio controller 130 of the audio system 200.

The position sensor 430 generates one or more measurement signals in response to motion of the headset 160. The position sensor 430 may be located on a portion of the frame 405 of the headset 130. The position sensor 430 may include a position sensor, an inertial measurement unit (IMU), or both. Some embodiments of the headset 160 may or may not include the position sensor 430 or may include more than one position sensors 430. In embodiments in which the position sensor 430 includes an IMU, the IMU generates IMU data based on measurement signals from the position sensor 430. Examples of position sensor 430 include: one or more accelerometers, one or more gyroscopes, one or more magnetometers, another suitable type of sensor that detects motion, a type of sensor used for error correction of the IMU, or some combination thereof. The position sensor 430 may be located external to the IMU, internal to the IMU, or some combination thereof.

Based on the one or more measurement signals, the position sensor 430 estimates a current position of the headset 160 relative to an initial position of the headset 160. The estimated position may include a location of the headset 160 and/or an orientation of the headset 160 or the user's head wearing the headset 160, or some combination thereof. The orientation may correspond to a position of each ear relative to a reference point. In some embodiments, the position sensor 430 uses the depth information and/or the absolute positional information from the DCA controller to estimate the current position of the headset 160. The position sensor 430 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 160 from the sampled data.

For example, the IMU integrates the measurement signals received from the accelerometers over time to estimate a velocity vector and integrates the velocity vector over time to determine an estimated position of a reference point on the headset 160. The reference point is a point that may be used to describe the position of the headset 160. While the reference point may generally be defined as a point in space, however, in practice the reference point is defined as a point within the headset 160.

The headset controller 420 may provide audio instructions to the speakers 415a, 415b for generating sound, e.g., based on the audio signal generated by the audio system 200. The headset controller 420 may further present video content to the user, e.g., on the display of the lens 410. The headset controller 420 may render the facial expression of the portion of the face of the human sound source predicted by the audio system 200 such that the predicted facial expression is in sync with the rendered audio signal provided to the user via the speakers 415a, 415b. The headset controller 420 may be an embodiment of the headset controller 220 of FIG. 2.

The headset controller 420 may receive, from the audio system 200 via the network 135, information about the predicted facial expression and information about the audio signal for presentation to the user, e.g., via a communication module coupled to the headset controller 420 (not shown in FIG. 4A). In one embodiment, the communication module (e.g., a transceiver) may be integrated into the headset controller 420. In another embodiment, the communication module may be external to the headset controller 420 and integrated into the frame 405 as a separate module coupled to the headset controller 420, e.g., the communication module 225 of FIG. 2.

The headset controller 420 may further generate an audio stream based on sound in the local area surrounding the headset 160 monitored by, e.g., the array of acoustic sensors 427. In some embodiments, the audio stream generated by the headset controller 420 includes a voice signal of the user. The communication module coupled to the headset controller 420 may communicate (e.g., via the network 135) the audio stream to the audio controller 130 of the audio system 200 for presentation in the local area 100.

Figure 4B:
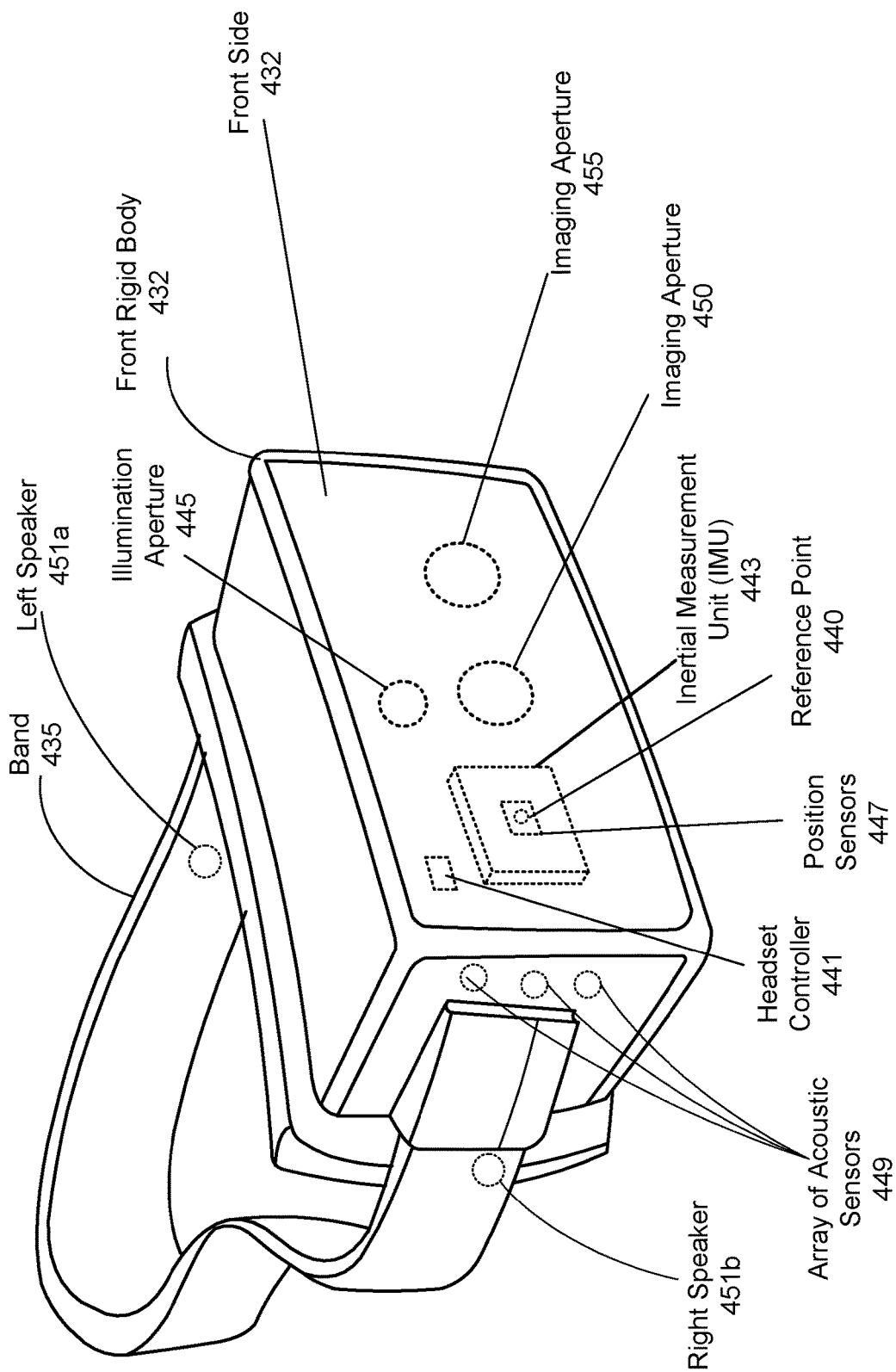
FIG. 4B is a perspective view of a headset implemented as a head-mounted display, in accordance with one or more embodiments.

FIG. 4B is a perspective view of the headset 160 implemented as a HMD, in accordance with one or more embodiments. In embodiments that describe an AR system and/or a MR system, portions of a front side 432 of the HMD are at least partially transparent in the visible band (~380 nm to 750 nm), and portions of the HMD that are between the front side 432 of the HMD and an eye of the user are at least partially transparent (e.g., a partially transparent electronic display). The HMD includes a front rigid body 432, a band 435, and a reference point 440. The HMD may also include a DCA configured to determine depth information of a local area surrounding some or all of the HMD. The HMD may also include an illumination aperture 445 and a pair of imaging apertures 450, 455 associated with the DCA. An illumination source of the DCA emits light (e.g., a structured light pattern) through the illumination aperture 445. At least one imaging device of the DCA captures light that is reflected from the local area through at least one of the imaging apertures 450, 455. The captured light may be images of the local area captured by multiple imaging devices of the DCA in stereo. A controller of the DCA may compute depth information for the local area using the captured light by applying a specific depth determination technique, e.g., direct/indirect time-of-flight depth sensing, structured light depth sensing, passive/active stereo depth sensing, some combination thereof, etc.

The front rigid body 432 may include one or more display elements (not shown in FIG. 4B), one or more integrated eye trackers (not shown in FIG. 4B), an IMU 443, one or more position sensors 447, and the reference point 440. In the embodiment shown by FIG. 4B, the position sensors 447 are located within the IMU 443, and neither the IMU 443 nor the position sensors 447 are visible to a user of the HMD. However, the position sensors 447 may be located external to the IMU 443, internal to the IMU 443, or some combination thereof. The HMD further includes an array of acoustic sensors 449 and speakers 451a, 451b that operate substantially in the same manner as the array of acoustic sensors 427 and the speakers 415a, 415b of FIG. 4A. A headset controller 441 is coupled with various components of the HMD and operates substantially in the same manner as the headset controller 420 of FIG. 4A.

System Environment

Figure 5:
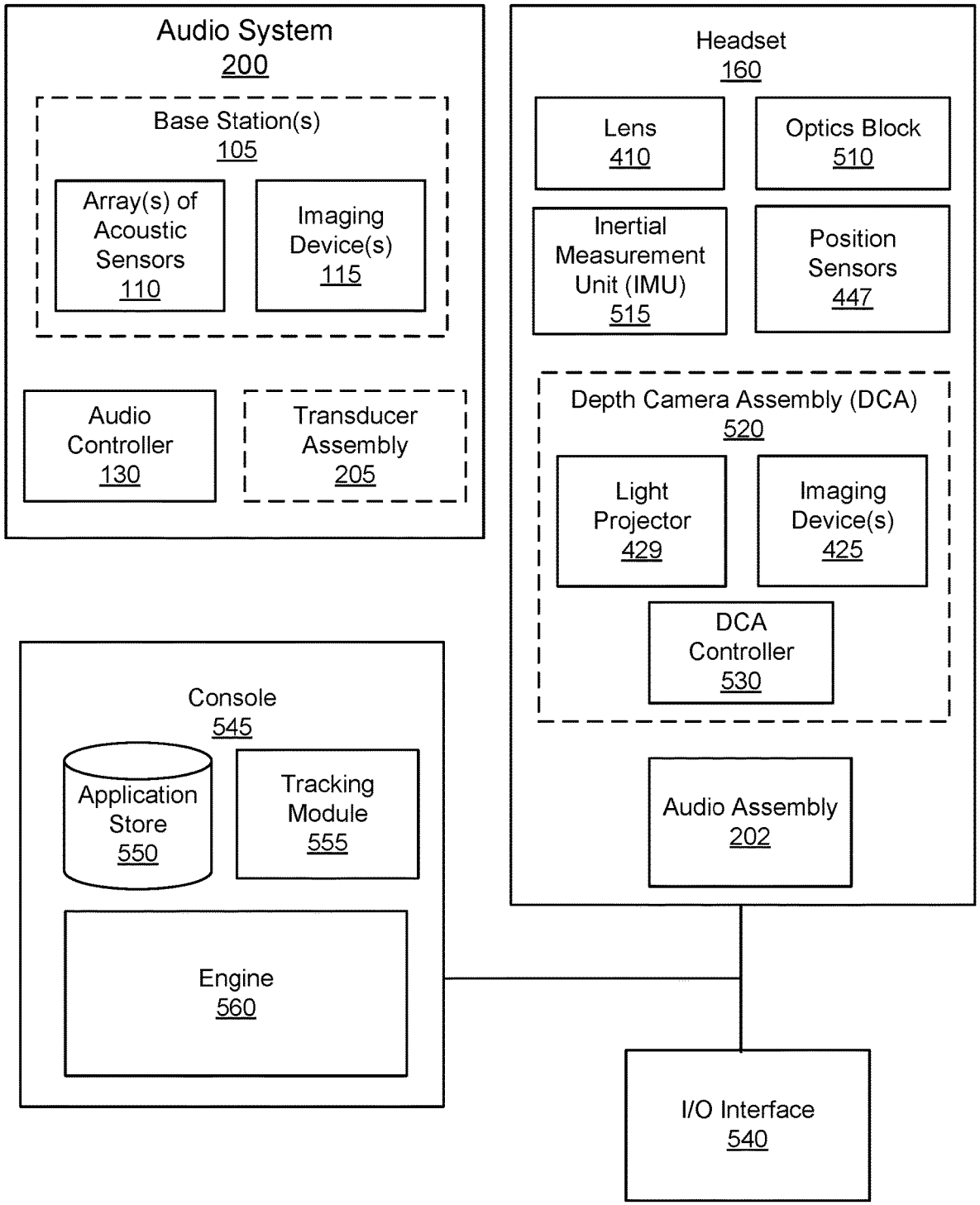
FIG. 5 is a block diagram of a system environment that includes a headset and an audio system, in accordance with one or more embodiments.

FIG. 5 is a block diagram of a system environment that includes a headset and an audio system, in accordance with one or more embodiments. The system 500 may operate in an artificial reality environment, e.g., a virtual reality, an augmented reality, a mixed reality environment, or some combination thereof. The system 500 shown by FIG. 5 includes the headset 160, the audio system 200 and an input/output (I/O) interface 540 that is coupled to a console 545. While FIG. 5 shows an example system 500 including one headset 160 and one I/O interface 540, in other embodiments any number of these components may be included in the system 500. For example, there may be multiple headsets 160 each having an associated I/O interface 540, with each headset 160 and I/O interface 540 communicating with the console 545. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 545 may be provided by the headset 160.

The headset 160 includes the lens 410, an optics block 510, one or more position sensors 447, an IMU 515, an optional DCA 520, and the audio assembly 202. Some embodiments of headset 160 have different components than those described in conjunction with FIG. 5, e.g., components of the HMD shown in FIG. 4B. Additionally, the functionality provided by various components described in conjunction with FIG. 5 may be differently distributed among the components of the headset 160 in other embodiments, or be captured in separate assemblies remote from the headset 160.

The lens 410 may include an electronic display that displays 2D or 3D images to the user in accordance with data received from the console 545. In various embodiments, the lens 410 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 510 magnifies image light received from the electronic display, corrects optical errors associated with the image light, and presents the corrected image light to a user of the headset 160. In various embodiments, the optics block 510 includes one or more optical elements. Example optical elements included in the optics block 510 include: an aperture, a Fresnel lens, a convex lens, a concave lens, a filter, a reflecting surface, or any other suitable optical element that affects image light. Moreover, the optics block 510 may include combinations of different optical elements. In some embodiments, one or more of the optical elements in the optics block 510 may have one or more coatings, such as partially reflective or anti-reflective coatings.

Magnification and focusing of the image light by the optics block 510 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 510 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 510 corrects the distortion when it receives image light from the electronic display generated based on the content.

The IMU 515 is an electronic device that generates data indicating a position of the headset 160 based on measurement signals received from one or more of the position sensors 447. A position sensor 447 generates one or more measurement signals in response to motion of the headset 160. Examples of position sensors 447 include: one or more accelerometers, one or more gyroscopes, one or more magnetometers, another suitable type of sensor that detects motion, a type of sensor used for error correction of the IMU 515, or some combination thereof. The position sensors 447 may be located external to the IMU 515, internal to the IMU 515, or some combination thereof.

In some embodiments, the headset 160 includes the DCA 520. The DCA 520 generates depth image data of a local area surrounding some or all of the headset 160. Depth image data includes pixel values defining distance from the imaging device, and thus provides a (e.g., 3D) mapping of locations captured in the depth image data. The DCA 520 includes the light projector 429, the one or more imaging devices 425, and a DCA controller 530. The light projector 429 may project a structured light pattern or other light that is reflected off objects in the local area and captured by the one or more imaging devices 425 to generate the depth image data.

For example, the light projector 429 may project a plurality of structured light (SL) elements of different types (e.g., lines, grids, or dots) onto a portion of a local area surrounding the headset 160. In various embodiments, the light projector 429 comprises an emitter and one or more diffractive optical elements. The emitter is configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA 520 comprises light in the infrared light part of the electromagnetic spectrum. In some embodiments, the illumination source is a laser configured to illuminate one or more diffractive optical elements with infrared light such that it is invisible to a human. In some embodiments, the illumination source may be pulsed. In some embodiments, the illumination source may be visible and pulsed such that the light is not visible to the eye.

The SL pattern projected into the local area by the DCA 520 deforms as it encounters various surfaces and objects in the local area. The one or more imaging devices 425 are each configured to capture one or more images of the local area. Each of the one or more images captured may include a plurality of SL elements (e.g., dots) projected by the light projector 429 and reflected by the objects in the local area. Each of the one or more imaging devices 425 may be a detector array, a camera, or a video camera.

In some embodiments, the DCA 520 generates depth image data using the time-of-flight depth sensing technique. The DCA 520 may generate the depth image data based on time required to light to be emitted from the light projector 429 until at least a portion of the light reflected from one or more objects in the local area is captured by the one or more imaging devices 425. In some other embodiments, the DCA 520 generates depth image data using active or passive stereo imaging. By comparing information about a local area from two vantage points, the DCA 520 may extract depth information based on relative positions of objects in two panels.

The DCA controller 530 generates the depth image data based on light captured by the one or more imaging devices 425. The DCA controller 530 may further provide the depth image data to the console 545, the headset controller 420, or some other component.

The audio assembly 202 provides audio instructions to speakers of the headset 160 for generating sound, e.g., based on an audio signal generated by the audio system 200. The audio assembly 202 may also present video content to the user in sync with the sound generated based on the audio signal from the audio system. The audio assembly 202 may render a facial expression of a human sound source predicted by the audio system 200 such that the predicted facial expression is in sync with the audio signal. The audio assembly 202 may receive, from the audio system 200, information about the predicted facial expression and information about the audio signal for presentation to the user. The audio assembly 202 may further generate an audio stream based on sound in the local area surrounding the headset 160 including a voice signal of the user. The audio assembly 202 may communicate the audio stream to the audio controller 130 of the audio system 200 for presentation in the local area 100 where the audio system 200 is located.

The audio system 200 is located in the local area 100 that is remote from the headset 160. The audio system 200 may be coupled to the headset 160 via the network 135 (not shown in FIG. 5). The audio system 200 may include the at least one array of acoustic sensors 110, the at least one imaging device 115 and the audio controller 130. In some embodiments, the audio system 200 includes one or more base stations 105 for mounting the at least one array of acoustic sensors 110 and the at least one imaging device 115. And in some embodiments, some or all of the at least one array of acoustic sensors 110 are on external devices (e.g., headsets and/or earbuds) within the local area. The audio system 200 may further include the transducer assembly 205 for presenting, e.g., a voice signal of a user of the headset 160. The audio system 200 detects (e.g., via the at least one array of acoustic sensors 110) sounds within a local area. The audio system 200 images (e.g., via the at least one imaging device 115) at least a portion of the local area. The audio system 200 identifies (e.g., via the audio controller 130) sounds from a human sound source in the local area, based in part on the detected sounds. The audio system 200 generates (e.g., via the audio controller 130) an audio signal for presentation to the user of the headset 160 within a virtual representation of the local area based in part on a location of the user within the virtual representation of the local area relative to a virtual representation of the human sound source within the virtual representation of the local area. The audio system 200 provides the audio signal to the headset 160 for presentation to the user.

The I/O interface 540 is a device that allows a user to send action requests and receive responses from the console 545. An action request is a request to perform a particular action. For example, an action request may be an instruction to start or end capture of image or video data, or an instruction to perform a particular action within an application. The I/O interface 540 may include one or more input devices. Example input devices include: a keyboard, a mouse, a game controller, or any other suitable device for receiving action requests and communicating the action requests to the console 545. An action request received by the I/O interface 540 is communicated to the console 545, which performs an action corresponding to the action request. In some embodiments, the I/O interface 540 includes the IMU 515, as further described above, that captures calibration data indicating an estimated position of the I/O interface 540 relative to an initial position of the I/O interface 540. In some embodiments, the I/O interface 540 may provide haptic feedback to the user in accordance with instructions received from the console 545. For example, haptic feedback is provided when an action request is received, or the console 545 communicates instructions to the I/O interface 540 causing the I/O interface 540 to generate haptic feedback when the console 545 performs an action. The console 545 provides content to the headset 160 for processing in accordance with information received from one or more of: the DCA 520, the headset 160, and the I/O interface 540. In the example shown in FIG. 5, the console 545 includes an application store 550, a tracking module 555, and an engine 560. Some embodiments of the console 545 have different modules or components than those described in conjunction with FIG. 5. Similarly, the functions further described below may be distributed among components of the console 545 in a different manner than described in conjunction with FIG. 5. In some embodiments, the functionality discussed herein with respect to the console 545 may be implemented in the headset 160, or a remote system.

The application store 550 stores one or more applications for execution by the console 545. An application is a group of instructions, that when executed by a processor, generates content for presentation to the user. Content generated by an application may be in response to inputs received from the user via movement of the headset 160 or the I/O interface 540. Examples of applications include: gaming applications, conferencing applications, video playback applications, or other suitable applications.

The tracking module 555 calibrates the local area of the system 500 using one or more calibration parameters and may adjust one or more calibration parameters to reduce error in determination of the position of the headset 160 or of the I/O interface 540. For example, the tracking module 555 communicates a calibration parameter to the DCA 520 to adjust the focus of the DCA 520 to more accurately determine positions of SL elements captured by the DCA 520. Calibration performed by the tracking module 555 also accounts for information received from the IMU 515 in the headset 160 and/or an IMU 515 included in the I/O interface 540. Additionally, if tracking of the headset 160 is lost (e.g., the DCA 520 loses line of sight of at least a threshold number of the projected SL elements), the tracking module 555 may re-calibrate some or all of the system 500.

The tracking module 555 tracks movements of the headset 160 or of the I/O interface 540 using information from the DCA 520, the one or more position sensors 447, the IMU 515 or some combination thereof. For example, the tracking module 555 determines a position of a reference point of the headset 160 in a mapping of a local area based on information from the headset 160. The tracking module 555 may also determine positions of an object or virtual object. Additionally, in some embodiments, the tracking module 555 may use portions of data indicating a position of the headset 160 from the IMU 515 as well as representations of the local area from the DCA 520 to predict a future location of the headset 160. The tracking module 555 provides the estimated or predicted future position of the headset 160 or the I/O interface 540 to the engine 560.

The engine 560 executes applications and receives position information, acceleration information, velocity information, predicted future positions, or some combination thereof, of the headset 160 from the tracking module 555. Based on the received information, the engine 560 determines content to provide to the headset 160 for presentation to the user. For example, if the received information indicates that the user has looked to the left, the engine 560 generates content for the headset 160 that mirrors the user's movement in a virtual local area or in a local area augmenting the local area with additional content. Additionally, the engine 560 performs an action within an application executing on the console 545 in response to an action request received from the I/O interface 540 and provides feedback to the user that the action was performed. The provided feedback may be visual or audible feedback via the headset 160 or haptic feedback via the I/O interface 540.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An audio system comprising:
   an acoustic sensor of an array of acoustic sensors, the acoustic sensor configured to:
     capture audio data from a human sound source, wherein at least a portion of a face of the human sound source is not within a field of view of an imaging device collocated with the human sound source; and
   a controller configured to:
     generate audio information for presentation to a remote user, wherein the audio information is presented to the remote user based at least in part on a location of the remote user, within a virtual representation of a local area, relative to a virtual representation of the human sound source,
     provide the audio information to a headset of the remote user, wherein the headset presents the audio information as part of the virtual representation of the local area to the remote user,
     predict a facial expression for the portion of the face based at least in part on the captured audio data from the human sound source, and provide, to the headset of the remote user, visual information associated with a virtual representation of the human sound source in the virtual representation of the local area, wherein the visual information is presented, to the headset of the remote user, such that the facial expression of the human sound source is in sync with the presented audio information.

2. The audio system of claim 1, wherein the acoustic sensor is part of a second headset or an earbud collocated with the human sound source.

3. The audio system of claim 1, wherein the controller is further configured to:
   provide, to the headset of the remote user via a network, the visual information comprising the predicted facial expression being in sync with the audio information.

4. The audio system of claim 1, wherein the facial expression comprises a lips movement of the virtual representation of the human sound source.

5. The audio system of claim 1, wherein the controller is further configured to:
   predict the facial expression for the portion of the face by applying a machine learning algorithm to the captured audio data from the human sound source.

6. The audio system of claim 1, wherein the controller is further configured to:
   selectively adjust the audio information in response to one or more inputs provided by the remote user; and
   provide the adjusted audio information to the headset of the remote user.

7. The audio system of claim 1, wherein the controller is further configured to:
   generate second audio information for presentation to the remote user within the virtual representation of the local area based at least in part on the location of the remote user, within the virtual representation of the local area, relative to a virtual representation of a second human sound source;
   provide the second audio information to the headset of the remote user; and
   responsive to one or more inputs provided by the remote user, selectively adjust the second audio information in accordance with the one or more inputs, and
   provide the adjusted second audio information to the headset of the remote user.

8. The audio system of claim 1, wherein the controller is further configured to:
   generate a plurality of versions of the captured audio data, each of the plurality of versions simulating sounds from a respective human sound source of a plurality of human sound sources, including and collocated with the human sound source, and sounds from a respective location of the respective human sound source; and
   identify the respective human sound source, based on matching each of the plurality of versions with the captured audio data.

9. The audio system of claim 1, wherein the controller is further configured to:
   determine a location of the human sound source by performing beam-steering type processing of the captured audio data; and
   determine the location of the remote user within the virtual representation of the local area, based at least in part on the determined location of the human sound source.

10. The audio system of claim 1, further comprising:
    a plurality of base stations in the local area including the acoustic sensor configured to detect sounds within the local area and the imaging device configured to image at least a portion of the local area.

11. A method comprising:
    capturing, using an acoustic sensor of an array of acoustic sensors, audio data from a human sound source, wherein at least a portion of a face of the human sound source is not within a field of view of an imaging device collocated with the human sound source;

generating audio information for presentation to a remote user, wherein the audio information is presented to the remote user based at least in part on a location of the remote user, within a virtual representation of a local area, relative to a virtual representation of the human sound source;

providing the audio information to a headset of the remote user, wherein the headset presents the audio information as part of the virtual representation of the local area to the remote user;

predicting a facial expression for the portion of the face based at least in part on the captured audio data from the human sound source; and providing, to the headset of the remote user, visual information associated with a virtual representation of the human sound source in the virtual representation of the local area, wherein the visual information is presented, to the headset of the remote user, such that the facial expression of the human sound source is in sync with the presented audio information.

12. The method of claim 11, wherein the acoustic sensor is part of a second headset collocated with the human sound source.

13. The method of claim 11, wherein predicting the facial expression for the portion of the face comprises predicting a lips movement of the virtual representation of the human sound source.

14. The method of claim 11, wherein predicting the facial expression for the portion of the face comprises:

predicting the facial expression by applying a machine learning algorithm to the captured audio data from the human sound source.

15. The method of claim 11, wherein further comprising:

selectively adjusting the audio information in response to one or more inputs provided by the remote user; and providing the adjusted audio information to the headset of the remote user.

16. The method of claim 11, further comprising:

generating second audio information for presentation to the remote user within the virtual representation of the local area based at least in part on the location of the remote user, within the virtual representation of the local area, relative to a virtual representation of a second human sound source;

providing the second audio information to the headset of the remote user; and responsive to one or more inputs provided by the remote user, selectively adjusting the second audio information in accordance with the one or more inputs, and providing the adjusted second audio information to the headset of the remote user.

17. The method of claim 11, further comprising:

generating a plurality of versions of the captured audio data, each of the plurality of versions simulating sounds from a respective human sound source of a plurality of human sound sources, including and collocated with the human sound source, and sounds from a respective location of the respective human sound source; and identifying the respective human sound source, based on matching each of the plurality of versions with the captured audio data.

18. The method of claim 11, further comprising:

determining a location of the human sound source by performing beam-steering type processing of the captured audio data; and determining the location of the remote user within the virtual representation of the local area, based at least in part on the determined location of the human sound source.

19. A computer program product comprising a non-transitory computer-readable storage medium having instructions encoded thereon that, when executed by one or more processors, cause the one or more processors to:

instruct an acoustic sensor of an array of acoustic sensors to capture audio data from a human sound source, wherein at least a portion of a face of the human sound source is not within a field of view of an imaging device collocated with the human sound source;

generate audio information for presentation to a remote user, wherein the audio information is presented to the remote user based at least in part on a location of the remote user, within a virtual representation of a local area, relative to a virtual representation of the human sound source;

provide the audio information to a headset of the remote user, wherein the headset presents the audio information as part of the virtual representation of the local area to the remote user;

predict a facial expression for the portion of the face based at least in part on the captured audio data from the human sound source; and provide, to the headset of the remote user, visual information associated with a virtual representation of the human sound source in the virtual representation of the local area, wherein the visual information is presented, to the headset of the remote user, such that the facial expression of the human sound source is in sync with the presented audio information.

20. The computer program product of claim 19, wherein the instructions further cause the one or more processors to:

predict the facial expression for the portion of the face by predicting a lips movement of the virtual representation of the human sound source.

* * * * *